United States Patent
Shimizu et al.

(10) Patent No.: US 6,311,495 B1
(45) Date of Patent: Nov. 6, 2001

(54) COMPOSITE POWER UNIT (75) Inventors: Michinori Shimizu; Kazuhiko Morimoto; Hiroshi Ohsawa; Yoshiaki Omata, all of Shizuoka-ken (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 09/655,789

(22) Filed: Sep. 6, 2000

(30) Foreign Application Priority Data

Sep. 8, 1999 (JP) .................................................. 11-253901

(51) Int. Cl.[7] .................................................... F01B 21/04
(52) U.S. Cl. ........................ 60/718; 60/698; 123/DIG. 8; 180/69.6
(58) Field of Search ............................ 60/698, 716, 718; 123/DIG. 8; 180/69.6

(56) References Cited

U.S. PATENT DOCUMENTS

| 4,116,006 | * | 9/1978 | Wallis | ................................ 60/718 X |
| 4,470,476 | * | 9/1984 | Hunt | .................................. 60/718 X |
| 4,625,823 | * | 12/1986 | Frank | ................................. 60/718 X |
| 5,398,508 | * | 3/1995 | Brown | ...................................... 60/718 |

FOREIGN PATENT DOCUMENTS

| 62-29979 | 6/1987 | (JP) . |
| 9-215270 | 8/1997 | (JP) . |
| 2708469 | 10/1997 | (JP) . |
| 10-80098 | 3/1998 | (JP) . |
| 11-78555 | 3/1999 | (JP) . |

* cited by examiner

*Primary Examiner*—Hoang Nguyen
(74) *Attorney, Agent, or Firm*—Flynn, Thiel, Boutell & Tanis, P.C.

(57) ABSTRACT

A composite power unit designed to permit the inertial moment of a flywheel to be positioned adjacent to one end of a crankshaft, thereby allowing the crankshaft to experience a reduced level of bending stress and torsional vibration. The composite power unit includes a flywheel mounted on a crankshaft at one end thereof, which flywheel is formed by a disk-like first flywheel and a second flywheel in which the former flywheel is positioned toward an engine while the latter flywheel is disposed toward a transmission. A rotational sensor and a dynamotor are both disposed between the first and second flywheels and are arranged in sequence from the side of the engine, a flange-like clutch-receiving surface is disposed on the second flywheel at an end thereof toward the transmission, and a clutch is attached to the clutch-receiving surface and covered by a transmission case of the transmission.

12 Claims, 7 Drawing Sheets

COMPOSITE POWER UNIT

FIELD OF THE INVENTION

This invention relates to a composite power unit for a vehicle. More particularly, it relates to an improved composite power unit designed to permit inertial moment of a flywheel to be positioned adjacent to one end of a crankshaft, thereby allowing the crankshaft to experience a reduced degree of bending stress and torsional vibration.

BACKGROUND OF THE INVENTION

One known type of vehicle, such as e.g., a hybrid car has both an engine and a dynamotor disposed therein as a power source. The hybrid car further has the dynamotor positioned between the engine and a transmission, thereby forming a composite power unit.

Such a composite power unit is disclosed in published Japanese Patent Application Examined No. 62-29979, granted Patent No. 2708469, and Japanese Patent Applications Laid-Open No. 9-215270, No. 10-80098, and No. 11-78555.

The above Application Nos. 10-80098 and 11-78555 disclose examples of conventional composite power units. In such examples, the dynamotor is disposed between an internal combustion engine and a flywheel.

However, as disclosed in the above publication, the flywheel is spaced apart from the crankshaft. Such positioning brings about an inconvenience in that vibrations cause the crankshaft to undergo an increased level of bending stress and torsional vibration, which is thus disadvantageous in view of practical use.

In addition, the dynamotor is in the way when a starter motor is disposed toward the engine. Consequently, the starter motor cannot be placed there.

In a front wheel-driven vehicle having the engine disposed therein in a transverse direction of the vehicle, a drive shaft is disposed so as to be close to both a transmission case of the transmission and the engine.

The flywheel has the greatest diameter in the transmission case in order to insure a large moment of inertia.

According to the above Application Nos. 10-80098 and 11-78555, a stator of the dynamotor has an outer diameter greater than that of the flywheel. This causes another inconvenience in that layout of components including the transmission must be changed in order to prevent interference with the drive shaft, which is then disadvantageous in view of practical use.

In order to obviate or at least minimize the above inconveniences, the present invention provides a composite power unit having an engine and a dynamotor both provided therein as a source of drive for a vehicle and further having the dynamotor disposed between the engine and a transmission. The composite power unit includes a crankshaft supported on a cylinder block of the engine; a flywheel arrangement mounted on the crankshaft at one end thereof, the flywheel arrangement being formed by a disk-like first flywheel and a second flywheel in which the first flywheel is positioned toward the engine, while the second flywheel is disposed toward the transmission; a rotational sensor and the dynamotor both disposed between the first and second flywheels, the sensor and the dynamotor being arranged in sequence from the side of the engine; a flange-like clutch-receiving surface disposed on the second flywheel at an end thereof toward the transmission; and a clutch attached to the clutch-receiving surface, the clutch being covered by a transmission case of the transmission.

According to the present invention, the first flywheel, the rotational sensor, the dynamotor, the clutch-receiving surface of the second flywheel, and the clutch are disposed in this order from the engine side toward the transmission. As a result, the inertial moment of the flywheel arrangement is positioned close to one end of the crankshaft, thereby reducing both bending stress and torsional vibration to be exerted on the crankshaft.

DETAILED DESCRIPTION

Embodiments of the present invention will now be described in detail with reference to the drawings.

Figure 2:
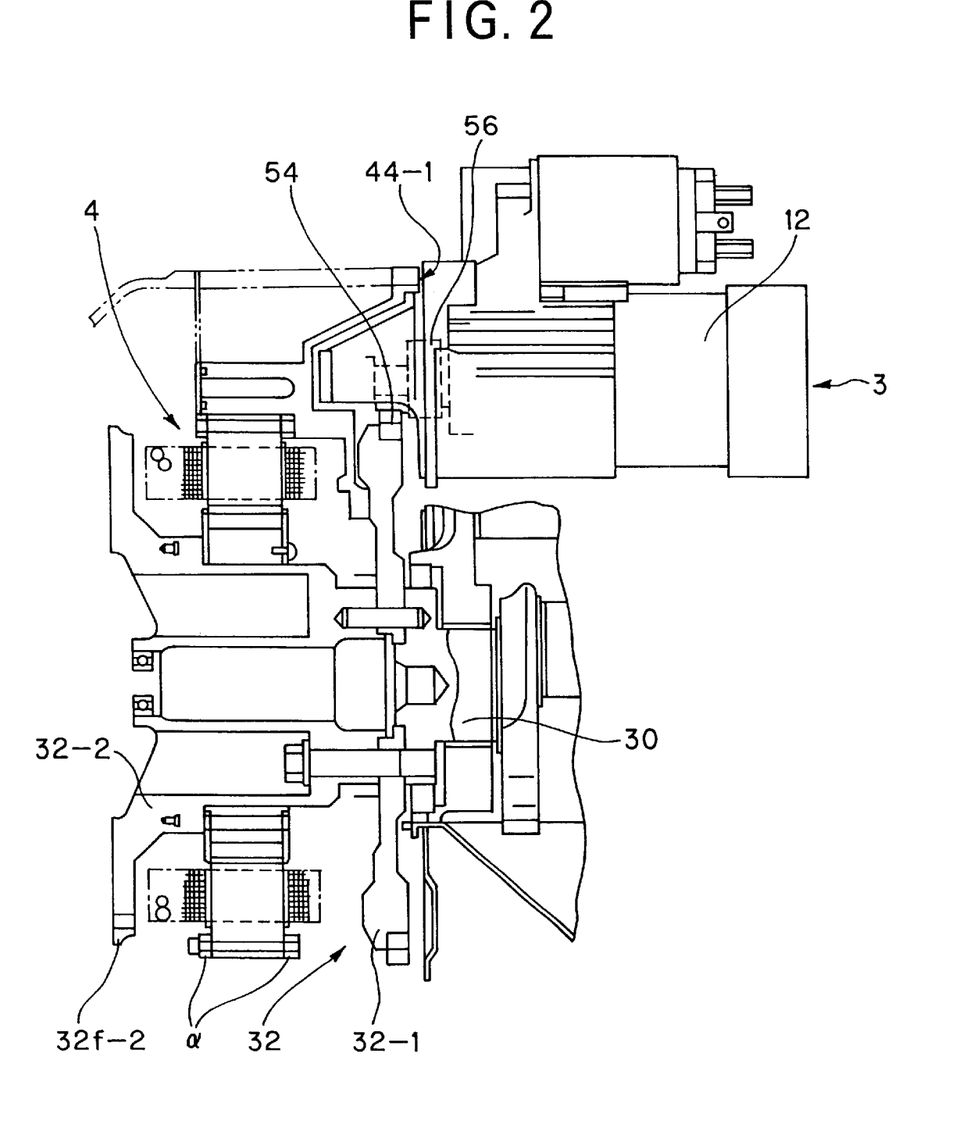
FIG. 2 is a schematic enlarged cross-sectional view, illustrating a starter motor mounted on a case of the dynamotor.
Figure 3:
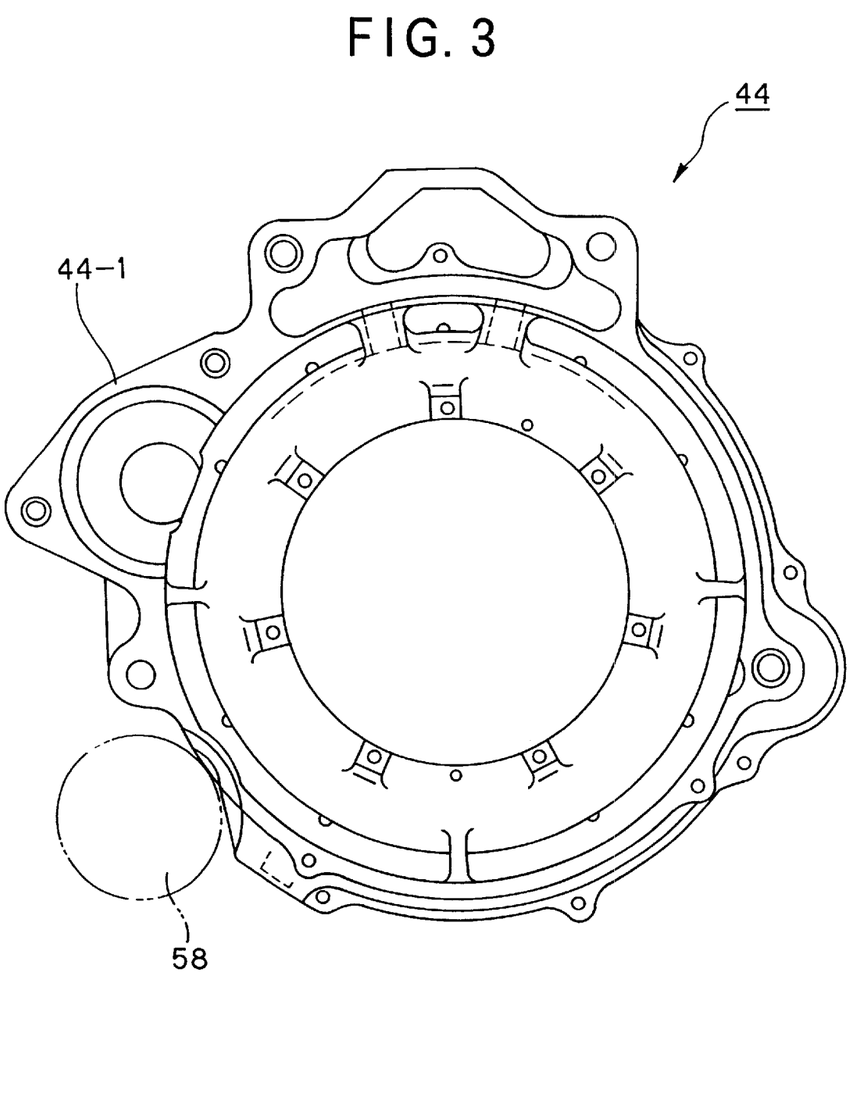
FIG. 3 is a schematic illustration, showing the dynamotor case when viewed in the direction of arrow 3 in FIG. 2.
Figure 4:
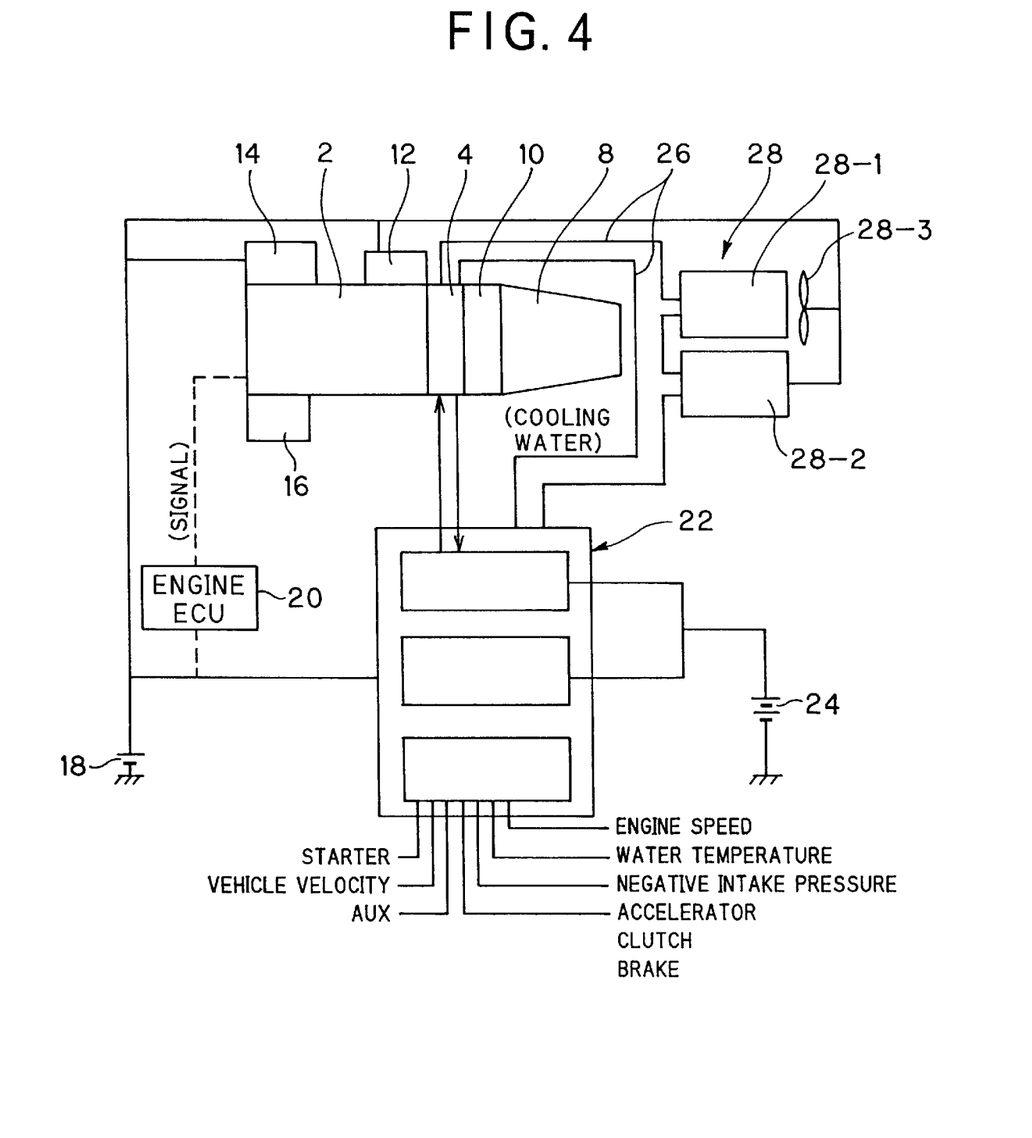
FIG. 4 is a schematic illustration, showing a system of the composite power unit.

FIGS. 1–6 illustrate an embodiment. In FIG. 4, reference numerals 2 and 4 denote an engine and a dynamotor, respectively. The engine 2 is disposed in, e.g., a front wheel-driven hybrid vehicle in a direction transverse to the direction of travel of the vehicle.

The engine 2 includes a cylinder block 6 (see FIG. 1), a cylinder head (not shown) attached to the top of the cylinder block 6, and an oil pan 7 fitted to the bottom of the cylinder block 6.

A description of the engine 2 and peripheral equipment will now be given. As illustrated in FIG. 4, the engine 2 communicates with a transmission 8. In addition, the dynamotor 4 and a clutch 10 are disposed between the engine 2 and the transmission 8. The dynamotor 4 and the clutch 10 are arranged in sequence from the output side of the engine 2.

The engine 2 is provided with a starter motor 12, an alternator 14, and an air-conditioner 16. A low-voltage battery 18 communicates with both the starter motor 12 and the alternator 14. The engine 2 is connected to an engine ECU or an engine control means 20.

In order to systematically separate the engine 2 from the dynamotor 4, the dynamotor 4 is connected to a dynamotor ECU or a dynamotor control means 22. The control means 22 is linked to a dynamotor battery 24. The control means 22 is further connected to a detection section (not shown) in order to receive a variety of detection signals. Such detection signals include a signal from a starter, signals indicative of vehicle velocity, AUX, engine speed, water temperature, and negative intake pressure and also signals from an accelerator, the clutch 10, and a brake.

A cooling water passage 26 is provided between the dynamotor 4 and the dynamotor control means 22 for interconnecting or allowing communication between the dynamotor 4 and the control means 22. A cooling means 28 is provided midway along the cooling water passage 26. The cooling means 28 includes a radiator 28-1 and a motor-driven water pump 28-2. These two components 28-1 and 28-2 are arranged in series. The radiator 28-1 is provided with a cooling fan 28-3.

Figure 5:
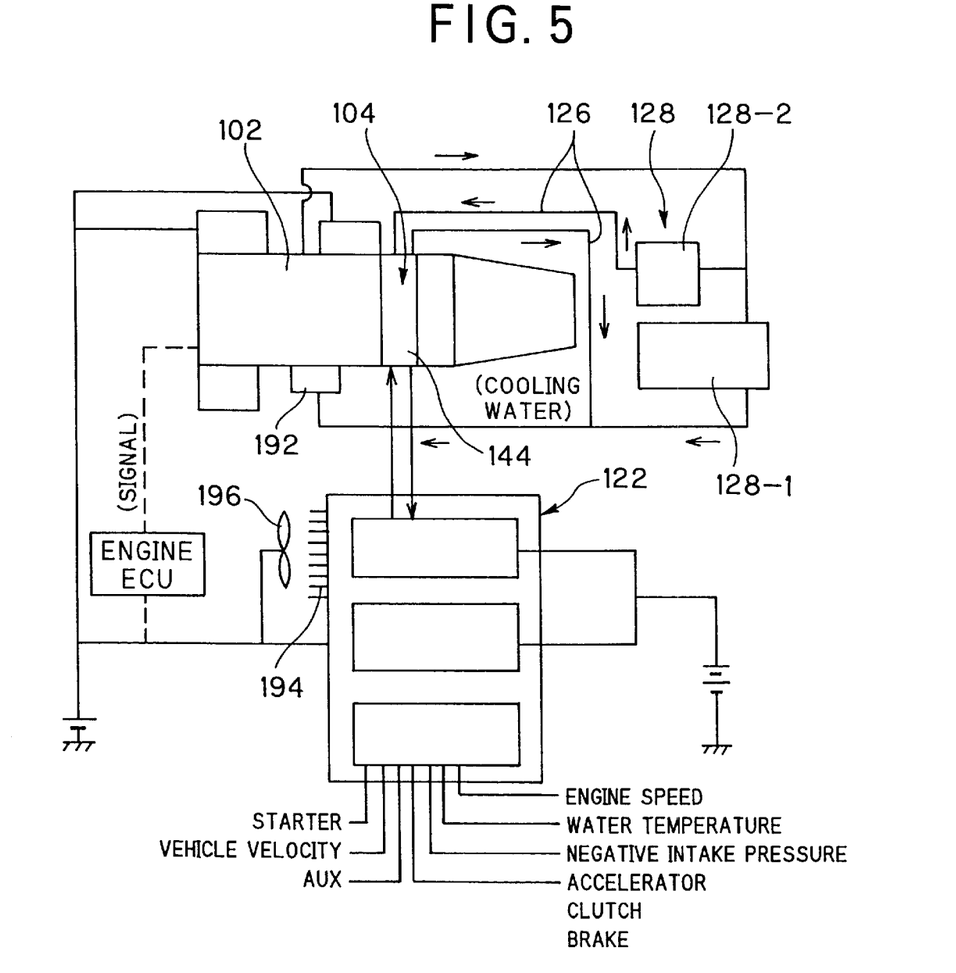
FIG. 5 is a schematic illustration, depicting a system of another example of a composite power unit.

Another cooling system is available, in which the engine 2 and its peripherals are separated from the dynamotor control means 22, as illustrated in FIG. 5. In FIG. 5, reference numerals are identified by the same reference numerals utilized in the embodiment of FIG. 4 except they are increased by "100". More specifically, an engine 102 is provided with a water pump 192; a radiator 128-1 and a heater core 128-2 are provided as a cooling means 128; and a cooling water passage 126 is provided. The cooling water passage 126 includes first, second, and third paths. The first path runs from the engine 102 to the water pump 192 through the radiator 128-1. The second path extends from the engine 102 to the water pump 192 through the heater core 128-2 and a case 144 of a dynamotor 104. The third path extends from the engine 102 to the water pump 192 through a throttle body (not shown). A dynamotor control means 122 has a radiation fin 194 disposed thereon. In addition, a fan 196 is provided so as to face the radiation fin 194 in order to provide a forced cooling status.

Figure 1:
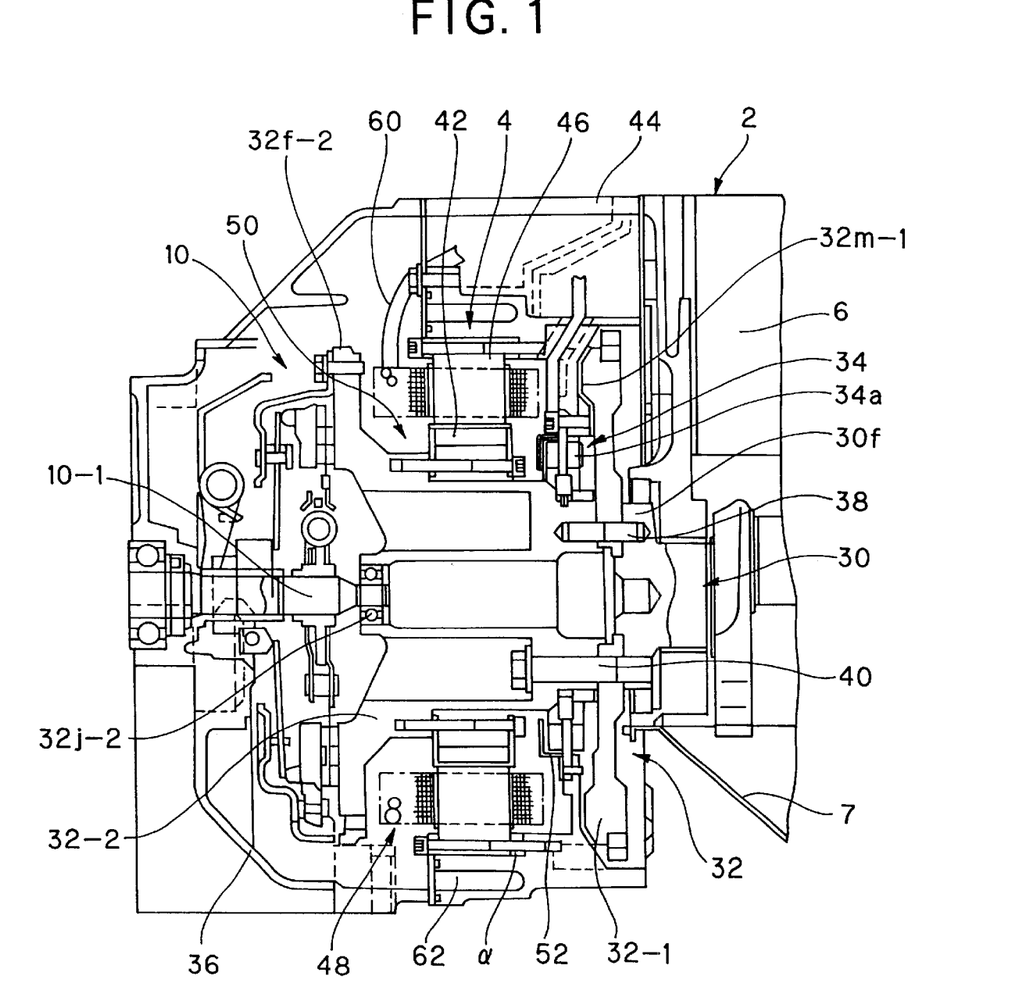
FIG. 1 is a schematic cross-sectional view, illustrating a dynamotor area of a composite power unit according to an embodiment of the present invention.

A crankshaft 30 is supported on the cylinder block 6. A flywheel arrangement 32 is disposed on the crankshaft 30 at one end thereof. The flywheel arrangement 32 is formed by a disk-like first flywheel 32-1 and a second flywheel 32-2. The first flywheel 32-1 is positioned toward the engine 2. The second flywheel 32-2 is disposed toward the transmission 8. The second flywheel 32-2 functions as a rotor shaft and generally has the form of a hat or a truncated cone, which rotor shaft 32-2 gradually increases in diameter with an increase in distance from the first flywheel 32-1. A rotational sensor 34 and dynamotor 4 are disposed between the first and second flywheels 32-1, 32-2. The sensor 34 and the dynamotor 4 are arranged in sequence from the side of the engine 2. A clutch-receiving surface 32f-2 in the form of a flange is provided on the second flywheel 32-2 at one end thereof toward the transmission 8. A bearing 32j-2 is provided at a central portion of the clutch-receiving surface 32f-2 for rotatably supporting a clutch disk shaft 10-1 of clutch 10. The clutch 10 is attached to the clutch-receiving surface 32f-2. The clutch 10 is covered by a transmission case 36 of the transmission 8.

A flange 30f is formed on the crankshaft 30 at one end thereof and the flywheels 32-1, 32-2 and the flange 30f are fitted together and are then clamped together by means of a mounting bolt 40 in a state of being positioned by means of a knock pin 38.

The dynamotor 4 includes a rotor 42 and coil-like stators 46. The rotor 42 is fixed to the second flywheel 32-2. The stators 46 are annularly disposed about an outer peripheral portion of the rotor 42. The stators 46 are assembled inside a case 44 of the dynamotor 4.

The stators 46 are integrally combined with each other by a plurality of annular combining means a which is bolted to the stators 46. Reference numeral 48 is referred to as a so-called "potting" or a method of coating having such flexibility as to allow for some movement of a coiled portion of an iron core. The coating method employs resin. In addition to twelve iron cores having a copper wire coiled thereon as practiced in the present embodiment, various forms of potting are available. For example, in a one-piece iron core having a plurality of iron cores incorporated therein and further having the copper wire coiled thereon, a coiled portion of the core is subjected to potting. In addition, in a dynamotor having a stator and a rotor both press-fitted in the case and the second flywheel, respectively, a coiled portion of the stator experiences potting. In this case, it is permissible that the stator has the iron core formed by laminated plates.

The sensor 34 and the rotor 42 are accommodated compactly in a void space 50. The space 50 is defined inside or radially inwardly of the stator 46 and axially between an annular protruding portion 32m-1 of the first flywheel 32-1 and the clutch-receiving surface 32f-2 of the second flywheel 32-2. The sensor 34 and a rotor 34a thereof are positioned inside or radially inwardly both of the annular protruding portion 32m-1 and the stator 46.

As illustrated in FIG. 2, the flywheel 32 has a starter motor-driven gear 54 disposed on the first flywheel 32-1. In addition, a starter motor-mounting portion or a starter motor-mounting surface 44-1 is provided on the case 44 at a position toward the engine 2.

Referring back to FIG. 1, a magnet-proof plate 52 is shown disposed between the sensor 34 and the dynamotor 4.

Starter motor 12 is disposed adjacent to the dynamotor 4. More specifically, as illustrated in FIG. 3, the starter motor-mounting surface 44-1 is provided on the case 44. The starter motor 12 is assembled on the case 44 at a position toward the cylinder block 6 by means of the starter motor-mounting surface 44-1.

Referring back to FIG. 2, the starter motor 12 is shown having a starter motor-driving gear 56 held in mesh with the starter motor-driven gear 54 of the first flywheel 32-1. The starter motor-driven gear 54 is provided on the first flywheel 32-1 at an outer peripheral portion thereof.

Figure 6:
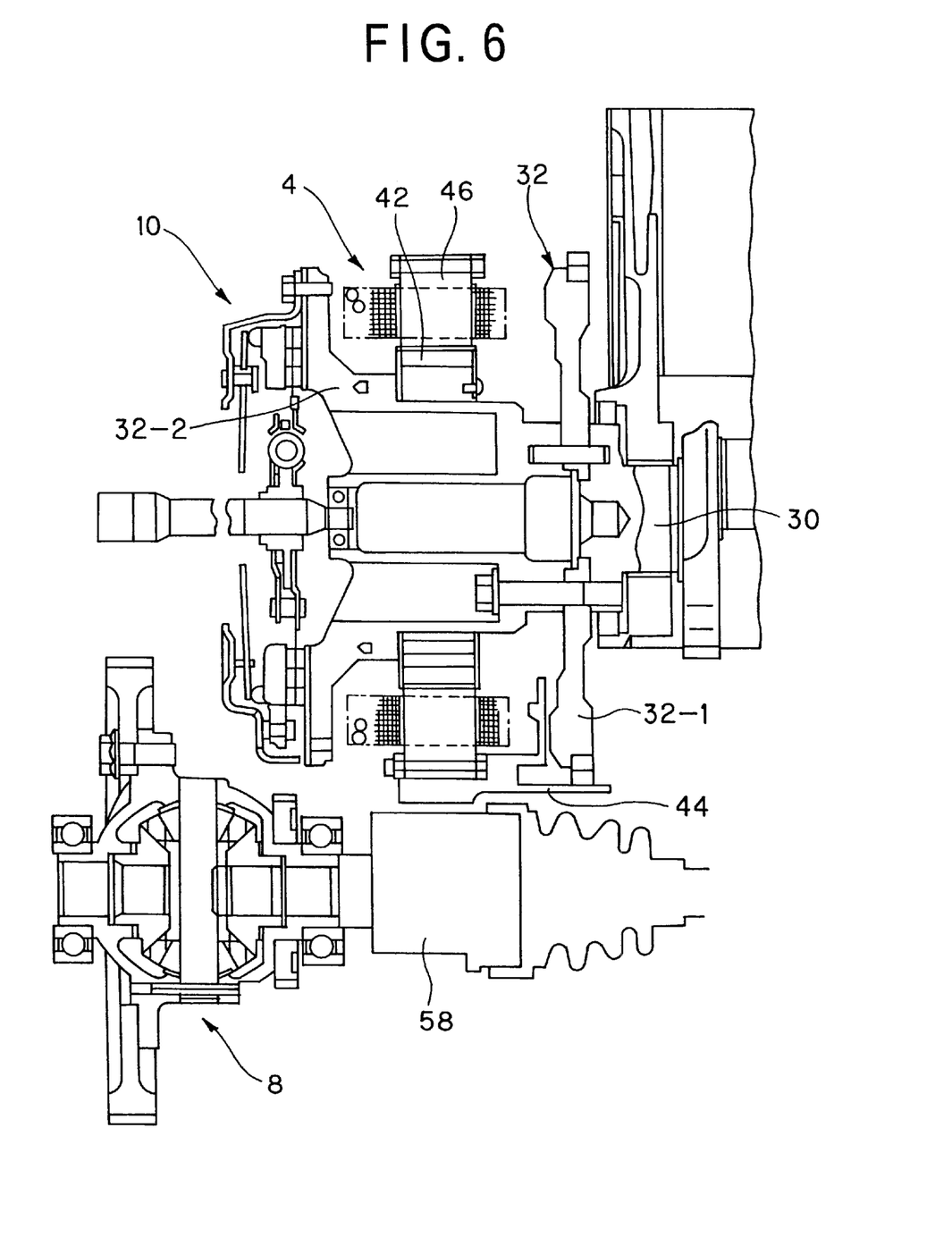
FIG. 6 is a schematic enlarged cross-sectional view, illustrating how a drive shaft is laid out in the dynamotor area of the composite power unit.

As shown in FIGS. 3 and 6, a drive shaft 58 is disposed so as to be close to the flywheel 32 for transmitting driving forces from the transmission 8 to the vehicle wheels (not shown).

The stator 46 has an outer diameter set to be equal to or somewhat smaller than outer diameters of the flywheels 32-1, 32-2 so that the transmission 8 and the drive shaft 58 can have a size substantially identical to a size of such components in conventional engine structures.

Reference numerals 60 and 62 denote a power cable and a water passage, respectively. The power cable 60 is connected to the stator 46. The water passage 62 is formed or located inside the case 44 in order to be connected to the cooling water passage 26.

Next, operation of the invention will be described.

When the engine 2 is driven into operation, then driving forces are transmitted from the engine 2 to the transmission 8 through the crankshaft 30. The transmitted driving forces are then transferred to wheels through the drive shaft 58. The drive shaft 58 communicates with the transmission 8.

The sensor 34 and the rotor 42 are accommodated in the void space 50 between the engine 2 and the transmission 8. The space 50 is defined inside the stator 46 and between the annular protruding portion 32m-1 and the clutch-receiving surface 32f-2. Rotation of the flywheel 32 causes the rotor 42 to be rotated therewith, thereby generating electricity.

The first flywheel 32-1, the sensor 34, the dynamotor 4, the clutch-receiving surface 32f-2, and the clutch 10 are arranged in this order from the side of the engine 2 in a direction toward the transmission 8. This arrangement allows the inertial moment of the flywheel 32 to be close to one end of the crankshaft 30. Consequently, the crankshaft 30 experiences a reduced level of both bending stress and torsional vibration. This is advantageous in view of practical use.

The flywheels 32-1, 32-2 and the flange 30f are fitted together, and are then fastened together by means of the bolt 40 while being positioned by means of the knock pin 38. This system allows for more efficient positioning and mounting of the first and second flywheels 32-1, 32-2.

The space 50 contains the sensor 34 and the rotor 42. The space 50 is defined inside the stator 46 and between the annular protruding portion 32m-1 and the clutch-receiving surface 32f-2. This configuration allows the sensor 34 and the rotor 42 to be accommodated in a space-saving manner. As a result, a smaller-sized dynamotor 4 is achievable.

The magnet-proof plate 52 is provided between the sensor 34 and the dynamotor 4. The magnet-proof plate 52 positively blocks magnetic influence from the dynamotor 4 which otherwise would be exerted on the sensor 34. This is advantageous in view of practical use.

The starter motor 12 is assembled on the case 44 at a position toward the cylinder block 6 by means of the starter motor-mounting surface 44-1 on the case 44. The starter motor-driven gear 54 is provided on the first flywheel 32-1 along the outer peripheral portion thereof. The driven gear 54 is engaged with the starter motor-driving gear 56 of the starter motor 12. This structure allows the starter motor 12 to be positioned toward the engine 2 without interfering with the dynamotor 4. As a result, conventional components or parts are in common use, with a consequential reduction in cost. This is advantageous from an economical viewpoint.

The low-voltage battery 18 and the dynamotor battery 24 are provided, in which the former battery 18 is used for operating the starter motor 12 and the alternator 14, while the latter battery 24 is used for actuating the dynamotor control means 22. Such individual batteries allow the engine 2 to be systematically separated from the dynamotor 4. Therefore, even when a failure occurs in the system of the dynamotor 4, the engine 2 continues to run normally, and is operable as is the case with a vehicle having only an engine disposed therein as in conventional practice. This is advantageous in view of practical use.

The stator 46 has the outer diameter set to be equal to or slightly smaller than the outer diameters of the flywheels 32-1, 32-2. Consequently, the transmission 8 and the drive shaft 58 can be laid out to a size substantially identical to a size in which these components are laid out in conventional engine structures. Therefore, the conventional layout of the transmission and the drive shaft need not be changed. This contributes toward cost savings from an economical viewpoint.

The present invention is not limited to the preceding embodiment, but is susceptible to applications, modifications, or variations.

For example, according to the present invention, the starter motor is mounted on the case of the dynamotor. Alternatively, the mounting bolt of the starter motor may be caused to extend through the dynamotor case in order to be assembled on the transmission case. Such an alternative eliminates individual bolts, i.e., one for mounting the starter motor on the dynamotor case and another for mounting the dynamotor case on the transmission case. Instead, a single mounting bolt may be employed. As a result, the composite power unit having fewer components and improved mounting operability is achievable. This is advantageous in view of practical use.

According to the present embodiment, the dynamotor's rotor and stator have respective opposed surfaces formed into a substantially planar shape. Alternatively, the opposed surfaces may be changed in shape in order to permit the inertial moment of the flywheel to be positioned closer to one end of the crankshaft.

Figure 7:
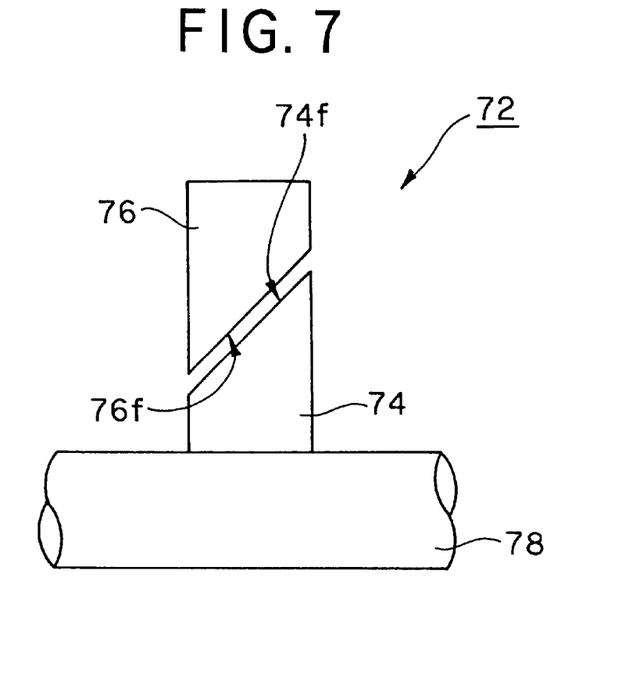
FIG. 7 is a schematic enlarged view, illustrating a rotor and a stator of a dynamotor according to a first variation of the invention.

More specifically, referring to FIG. 7, a dynamotor 72 is shown including a rotor 74 and a stator 76. The rotor 74 has an opposed surface 74f slanted so as to permit a portion of such a slanted surface (i.e. the portion adjacent a flywheel (not shown) or to the right in FIG. 7) to protrude toward a stator 76. The flywheel (not shown) has a motor-mounting portion separated from a clutch-receiving surface. The stator 76 has an opposed surface 76f formed to permit the opposed surface 76f to be coincident with the opposed surface 74f.

Consequently, it is possible that the rotor 74 fixed to a revolving shaft 78 has a center of gravity displaced toward the flywheel (to the right in FIG. 7). Thus, the inertial moment of the flywheel can be positioned adjacent to one end of the crankshaft. As a result, the crankshaft experiences a reduced level of both bending stress and torsional vibration. In addition, the rotor 74 and the stator 76 can be opposed to one another over a greater area. Such features contribute toward improvement in the function of the dynamotor 72 to generate electric power. This is advantageous in view of practical use.

Figure 8:
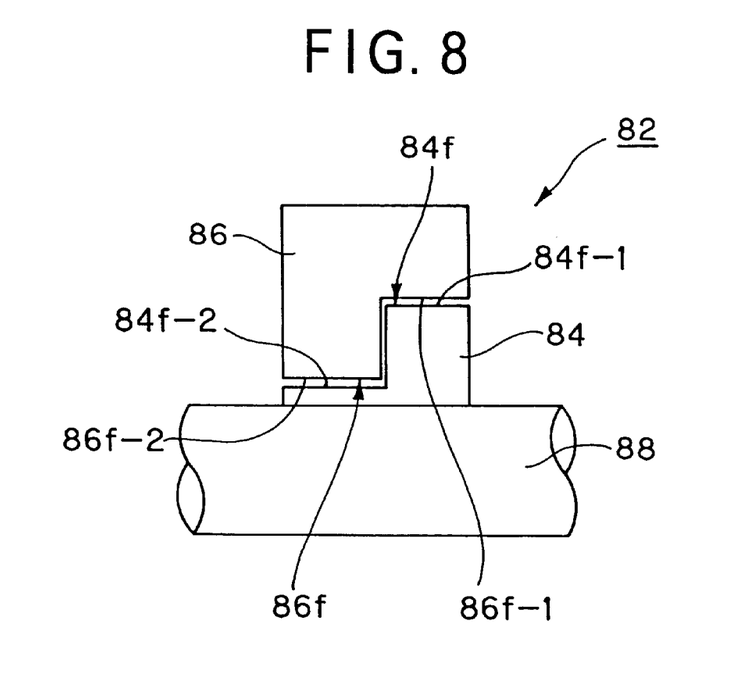
FIG. 8 is a schematic enlarged view, illustrating a rotor and a stator of a dynamotor according to a second variation of the invention.

Referring to FIG. 8, a dynamotor 82 is shown including a rotor 84 and a stator 86. In order to shift the center of gravity, it is permissible that the rotor 84 has an opposed surface 84f formed by first and second surfaces 84f-1, 84f-2, which first and second surfaces differ in height from one another or are stepped, while the stator 86 has an opposed surface 86f defined by first and second surfaces 86f-1, 86f-2 so as to permit the opposed surface 86f to be consistent in shape with the opposed surface 84f.

The above configuration allows the rotor 84 fixed to a revolving shaft 88 to have the center of gravity shifted toward a flywheel (to the right in FIG. 8). The flywheel has a motor-mounting portion separated from a clutch-receiving surface. Thus, the inertial moment of the flywheel can be positioned near one end of the crankshaft. As a result, the crankshaft undergoes a reduced degree of both bending stress and torsional vibration. In addition, the rotor 84 and the stator 86 can be opposed to one another over a greater area. Such features contribute toward improvement in the function of the dynamotor 82 to generate electric power. This is advantageous in view of practical use.

As amplified in the above description, the present invention provides a composite power unit having the engine and the dynamotor both provided therein as a source of drive and further having the dynamotor disposed between the engine and the transmission. The composite power unit includes the crankshaft supported on the cylinder block of the engine; the flywheel arrangement mounted on the crankshaft at one end thereof, the flywheel arrangement being formed by the disk-like first flywheel and the second flywheel in which the former flywheel is positioned toward the engine while the latter flywheel is disposed toward the transmission; the rotational sensor and the dynamotor both disposed between the first and second flywheels, the sensor and the dynamotor being arranged in sequence from the side of the engine; a flange-like clutch-receiving surface disposed on the second flywheel at an end thereof toward the transmission; and a clutch attached to the clutch-receiving surface, the clutch being covered by a transmission case of the transmission. As a result, the first flywheel, the sensor, the dynamotor, the clutch-receiving surface, and the clutch are arranged in this order from the side of the engine toward the transmission. This arrangement allows the inertial moment of the flywheel to be positioned close to one end of the crankshaft. Consequently, the crankshaft experiences a reduced level of both bending stress and torsional vibration. This is advantageous in view of practical use.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A composite power unit having an engine and a dynamotor both provided therein as a source of drive and further having the dynamotor disposed between the engine and a transmission, comprising: a crankshaft supported on a cylinder block of the engine; a flywheel arrangement mounted on the crankshaft at one end thereof, the flywheel arrangement being formed by a disk-like first flywheel and a second flywheel, in which the first flywheel is positioned toward the engine while the second flywheel is disposed toward the transmission; a rotational sensor and the dynamotor both disposed between the first and second flywheels, the sensor and the dynamotor being arranged in sequence from a side of the engine; a flange-like clutch-receiving surface disposed on the second flywheel at an end of the second flywheel adjacent the transmission; and a clutch attached to the clutch-receiving surface, the clutch being covered by a transmission case of the transmission.

2. A composite power unit as defined in claim 1, wherein a flange is formed on the crankshaft at one end thereof, and the flange and the first and second flywheels are fitted together and then clamped together by means of a mounting bolt.

3. A composite power unit as defined in claim 1, wherein the second flywheel functions as a rotor shaft having a general shape of a truncated cone, the rotor shaft increasing in diameter with an increase in distance from the first flywheel.

4. A composite power unit as defined in claim 1, wherein the rotational sensor and a rotor of the dynamotor are accommodated in a space inside a stator of the dynamotor and between an annular protruding portion of the first flywheel and a flange-like clutch-receiving surface of the second flywheel.

5. A composite power unit as defined in claim 1, wherein the rotational sensor and a rotor of the rotational sensor are accommodated inside both of an annular protruding portion of the first flywheel and a stator of the dynamotor.

6. A composite power unit as defined in claim 1, wherein a starter motor-driven gear is disposed on the first flywheel, and wherein a starter motor-mounting portion is provided on a case of the dynamotor at a position toward the engine.

7. A composite power unit as defined in claim 1, wherein a magnet-proof plate is disposed between the rotational sensor and the dynamotor.

8. A composite power unit as defined in claim 1, wherein said crankshaft defines an axis and said first and second flywheels are axially spaced from one another, said dynamotor includes at least one stator and a rotor fixed to said second flywheel, said rotor and said sensor being disposed axially between said first and second flywheels and radially inwardly of said stator.

9. A composite power unit as defined in claim 1, wherein said crankshaft defines an axis, said first flywheel being disposed closely adjacent a side of the engine, said sensor is disposed generally axially between said first flywheel and said dynamotor, and said clutch-receiving surface is disposed generally axially between said dynamotor and said clutch so that an inertial moment of the flywheel is oriented closely adjacent said one end of said crankshaft to reduce bending stress and torsional vibration thereof.

10. A composite power unit as defined in claim 1, wherein said dynamotor includes a rotor fixed to a rotating member and a stator disposed radially outwardly of said rotor, said rotor defining a surface disposed in opposed relation with a corresponding surface of said stator and having a configuration which displaces a center of gravity of said rotor towards said flywheel.

11. A composite power unit as defined in claim 10, wherein said opposed surfaces of said rotor and said stator are inclined relative to an axis of the rotating member or are stepped.

12. A vehicle having a composite power unit drivingly connected to a transmission, the composite power unit including an engine and a dynamotor both provided therein as a source of drive for the vehicle and further having the dynamotor disposed between the engine and the transmission, comprising: a crankshaft supported on a cylinder block of the engine; a flywheel arrangement mounted on the crankshaft at an output end thereof, the flywheel arrangement being formed by first and second flywheels, in which the first flywheel is positioned toward the engine, while the second flywheel is disposed toward the transmission; a rotational sensor and the dynamotor both disposed between the first and second flywheels, the sensor and the dynamotor being arranged in sequence from the outside of the engine; a flange-like clutch-receiving surface disposed on the second flywheel; and a clutch attached to the clutch-receiving surface and covered by a transmission case of the transmission.

* * * * *